(12) United States Patent
Morosawa et al.

(10) Patent No.: US 11,364,876 B2
(45) Date of Patent: Jun. 21, 2022

(54) VEHICLE CONTROL DEVICE, VEHICLE CONTROL METHOD, AND RECORDING MEDIUM

(71) Applicant: HONDA MOTOR CO., LTD., Tokyo (JP)

(72) Inventors: Ryo Morosawa, Wako (JP); Haisong Liu, Wako (JP); Fumiaki Yamaguchi, Tokyo (JP); Akira Nakajima, Wako (JP); Kenji Okuma, Wako (JP); Hiroaki Maruyama, Wako (JP); Yoshikazu Matsuo, Wako (JP); Shuto Higashi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/197,772

(22) Filed: Mar. 10, 2021

(65) Prior Publication Data

US 2021/0291790 A1  Sep. 23, 2021

(30) Foreign Application Priority Data

Mar. 18, 2020 (JP) .............................. JP2020-048070

(51) Int. Cl.

| | |
|---|---|
| *B60R 25/31* | (2013.01) |
| *B60R 25/25* | (2013.01) |
| *G06K 9/00* | (2022.01) |
| *B60R 25/30* | (2013.01) |
| *B60R 25/01* | (2013.01) |
| *G06V 20/56* | (2022.01) |

(Continued)

(52) U.S. Cl.
CPC .............. *B60R 25/31* (2013.01); *B60R 25/01* (2013.01); *B60R 25/25* (2013.01); *B60R 25/305* (2013.01); *G06V 20/56* (2022.01); *G06V 40/166* (2022.01); *G06V 40/173* (2022.01); *G06V 40/50* (2022.01)

(58) Field of Classification Search
CPC ......... B60R 25/31; B60R 25/01; B60R 25/25; B60R 25/305; G06K 9/00255; G06K 9/00295; G06K 9/00791; G06K 9/00926
See application file for complete search history.

(56) References Cited

U.S. PATENT DOCUMENTS

| 9,576,189 B2 * | 2/2017 | Lim ....................... G06V 40/16 |
| 10,824,704 B2 * | 11/2020 | Weller ................... G06V 40/10 |

(Continued)

FOREIGN PATENT DOCUMENTS

JP        2003-138817        5/2003

*Primary Examiner* — Thomas D Alunkal
(74) *Attorney, Agent, or Firm* — Rankin, Hill & Clark LLP (57) ABSTRACT

A vehicle control device includes: an unregistered-user-face-image acquiring unit that acquires an unregistered-user-face-image when an unregistered-user-getting-on recognizing unit recognizes that an unregistered user gets on the vehicle, the unregistered-user-face-image being a face image of the unregistered user; and a vehicle entry control unit that sets vehicle to a first entry-enabled-state when a matching degree between a user-candidate-face-image and the unregistered-user-face-image is equal to or higher than a first determination level, after the unregistered-user-getting-on recognizing unit recognizes that the unregistered user gets on the vehicle until a predetermined time elapses, the user-candidate-face-image being acquired by a user-candidate-face-image acquiring unit.

10 Claims, 7 Drawing Sheets

(51) Int. Cl.
*G06V 40/50* (2022.01)
*G06V 40/16* (2022.01)

(56) References Cited

U.S. PATENT DOCUMENTS

| | | | | |
|---|---|---|---|---|
| 2004/0263323 | A1* | 12/2004 | Seike | B60R 25/33 |
| | | | | 340/426.1 |
| 2006/0082437 | A1* | 4/2006 | Yuhara | B60R 25/255 |
| | | | | 340/5.82 |
| 2014/0309806 | A1* | 10/2014 | Ricci | G06Q 10/20 |
| | | | | 701/1 |
| 2015/0370253 | A1* | 12/2015 | Gurin | B60W 50/085 |
| | | | | 701/1 |
| 2016/0294837 | A1* | 10/2016 | Turgeman | G06F 21/316 |
| 2018/0338229 | A1* | 11/2018 | Nemec | H04W 4/40 |
| 2019/0210559 | A1* | 7/2019 | Krainer | G06F 9/452 |

* cited by examiner

VEHICLE CONTROL DEVICE, VEHICLE CONTROL METHOD, AND RECORDING MEDIUM

INCORPORATION BY REFERENCE

The present application claims priority under 35 U.S.C. § 119 to Japanese Patent Application No. 2020-048070 filed on Mar. 18, 2020. The content of the application is incorporated herein by reference in its entirety.

BACKGROUND OF THE INVENTION

Field of the Invention

The present invention relates to a vehicle control device, a vehicle control method, and a recording medium.

Description of the Related Art

Conventionally, there has been known an entry system that permits entry to a vehicle by personal authentication for a target person approaching the vehicle, using an image of surroundings of the vehicle taken by a camera (see, for example, Japanese Patent Laid-Open No. 2003-138817). The entry system identifies whether the target person is a user depending on the degree of agreement between the iris data of the target person recognized from the image of the target person approaching the vehicle and the iris data of the user registered in advance.

In the conventional entry system, personal authentication is performed only for a user (generally a driver) registered in advance. Therefore, passengers other than the user cannot use the entry function to the vehicle by the image.

In this case, for example, when the user and the passenger get off the vehicle and then notice that the passenger has left something in the vehicle, the passenger alone cannot gain entry to the vehicle even if the passenger returns to the vehicle, and there is a trouble of having to return to the vehicle with the user.

An object of the present invention is to provide a vehicle control device, a vehicle control method, and a recording medium capable of allowing passengers other than registered users to gain entry to a vehicle.

SUMMARY OF THE INVENTION

As a first aspect for achieving the object, there is provided a vehicle control device, including: a user-candidate-face-image acquiring unit that acquires a user-candidate-face-image from a surrounding image of a vehicle, the user-candidate-face-image being a face image of a user candidate of the vehicle, the user candidate of the vehicle being present in surroundings of the vehicle, the surrounding image of the vehicle being taken by a camera provided in the vehicle; an unregistered-user-getting-on recognizing unit that recognizes that an unregistered user gets on the vehicle, the unregistered user not being registered as a user for the vehicle; an unregistered-user-face-image acquiring unit that acquires an unregistered-user-face-image when the unregistered-user-getting-on recognizing unit recognizes that the unregistered user gets on the vehicle, the unregistered-user-face-image being a face image of the unregistered user; and a vehicle entry control unit that sets the vehicle to a first entry-enabled-state when a matching degree between the user-candidate-face-image and the unregistered-user-face-image is equal to or higher than a first determination level, after the unregistered-user-getting-on recognizing unit recognizes that the unregistered user gets on the vehicle until a predetermined time elapses, the user-candidate-face-image being acquired by the user-candidate-face-image acquiring unit.

The vehicle control device may be configured such that: the vehicle entry control unit sets the vehicle to a second entry-enabled-state when a matching degree between the user-candidate-face-image and an authentication-face-image of a registered user is equal to or higher than a second determination level, the second entry-enabled-state being a state in which a door of the vehicle is unlocked and running operation of the vehicle is enabled, the user-candidate-face-image being acquired by the user-candidate-face-image acquiring unit, the registered user having been registered as a user for the vehicle; and the first entry-enabled-state is a state in which a door of the vehicle is unlocked and running operation of the vehicle is disabled.

The vehicle control device may be configured such that: when a face image of the unregistered user is extracted from a surrounding image of the vehicle, the unregistered-user-face-image acquiring unit acquires the extracted face image of the unregistered user as the unregistered-user-face-image, the surrounding image being taken by the camera.

The vehicle control device may include a power-supply-state recognizing unit that recognizes a power supply state of the vehicle, and may be configured such that the unregistered-user-getting-on recognizing unit recognizes that the unregistered user gets on the vehicle, after the power-supply-state recognizing unit recognizes that the power supply is shifted from on state to off state.

The vehicle control device may include a running speed recognizing unit that recognizes a running speed of the vehicle, and may be configured such that the unregistered-user-getting-on recognizing unit recognizes that the unregistered user gets on the vehicle, after the vehicle is recognized to have started running based on the running speed of the vehicle, the running speed being recognized by the running speed recognizing unit.

The vehicle control device may be configured such that: the unregistered-user-getting-on recognizing unit recognizes that the unregistered user gets on the vehicle when the unregistered-user-getting-on recognizing unit recognizes that the unregistered user stays in the vehicle interior for a predetermined time or longer.

The vehicle control device may include: a communication control unit that communicates with a registered user terminal used by a registered user who has been registered as a user for the vehicle; and a registered-user-information storage unit that stores registered-user-information in a storage unit, the registered-user-information being information in which the unregistered-user-face-image and information of the registered user terminal are associated with each other, and may be configured such that, when a matching degree between the user-candidate-face-image and the unregistered-user-face-image is equal to or higher than the first determination level so that the vehicle entry control unit sets the vehicle to the first entry-enabled-state, the vehicle entry control unit acquires information of the registered user terminal with reference to the registered user information so that the vehicle entry control unit transmits entry permission notification information to the registered user terminal via the communication control unit, the user-candidate-face-image being acquired by the user-candidate-face-image acquiring unit, the entry permission notification information including the unregistered-user-face-image or the user-candidate-face-image, the entry-permission-notification-information notifying that the vehicle is set to the first entry-enabled-state.

The vehicle control device may be configured such that: when a matching degree between the user-candidate-face-image and the unregistered-user-face-image is lower than the first determination level and equal to or higher than a third determination level, the vehicle entry control unit transmits entry-permissibility-confirmation-information to the registered user terminal via the communication control unit, the user-candidate-face-image being acquired by the user-candidate-face-image acquiring unit, the entry-permissibility-confirmation-information including the user-candidate-face-image, the entry-permissibility-confirmation-information inquiring whether the vehicle is to be set to the first entry-enabled-state.

As a second aspect for achieving the above object, there is provided a vehicle control method executed by a computer, the method including: a user-candidate-face-image acquiring step that acquires a user-candidate-face-image from a surrounding image of a vehicle, the user-candidate-face-image being a face image of a user candidate of the vehicle, the user candidate of the vehicle being present in surroundings of the vehicle, the surrounding image of the vehicle being taken by a camera provided in the vehicle; an unregistered-user-getting-on recognizing step that recognizes that an unregistered user gets on the vehicle, the unregistered user not being registered as a user for the vehicle; an unregistered-user-face-image acquiring step that acquires an unregistered-user-face-image when the unregistered-user-getting-on recognizing step recognizes that the unregistered user gets on the vehicle, the unregistered-user-face-image being a face image of the unregistered user; and a vehicle entry control step that sets the vehicle to a first entry-enabled-state when a matching degree between the user-candidate-face-image and the unregistered-user-face-image is equal to or higher than a first determination level, after the unregistered-user-getting-on recognizing step recognizes that the unregistered user gets on the vehicle until a predetermined time elapses, the user-candidate-face-image being acquired by the user-candidate-face-image acquiring step.

As a third aspect for achieving the above object, there is provided a non-transient recording medium on which a vehicle control program is recorded, the vehicle control program causing a computer to function as: a user-candidate-face-image acquiring unit that acquires a user-candidate-face-image from a surrounding image of a vehicle, the user-candidate-face-image being a face image of a user candidate of the vehicle, the user candidate of the vehicle being present in surroundings of the vehicle, the surrounding image of the vehicle being taken by a camera provided in the vehicle; an unregistered-user-getting-on recognizing unit that recognizes that an unregistered user gets on the vehicle, the unregistered user not being registered as a user for the vehicle; an unregistered-user-face-image acquiring unit that acquires an unregistered-user-face-image when the unregistered-user-getting-on recognizing unit recognizes that the unregistered user gets on the vehicle, the unregistered-user-face-image being a face image of the unregistered user; and a vehicle entry control unit that sets the vehicle to a first entry-enabled-state when a matching degree between the user-candidate-face-image and the unregistered-user-face-image is equal to or higher than a first determination level, after the unregistered-user-getting-on recognizing unit recognizes that the unregistered user gets on the vehicle until a predetermined time elapses, the user-candidate-face-image being acquired by the user-candidate-face-image acquiring unit.

According to the vehicle control device, when an unregistered user gets on the vehicle, the unregistered-user-face-image acquiring unit acquires the unregistered-user-face-image. Then, after the unregistered user is recognized to get on the vehicle until the predetermined time elapses, when the matching degree between the user-candidate-face-image acquired by the user-candidate-face-image acquiring unit and the unregistered-user-face-image is equal to or higher than the first determination level, the vehicle entry control unit sets the vehicle to the first entry-enabled-state.

As a result, entry to the vehicle is enabled for passengers other than registered users.

DETAILED DESCRIPTION OF THE PREFERRED EMBODIMENTS

1. Vehicle Configuration

A configuration of a vehicle 1 equipped with a vehicle control device 10 of this embodiment is described below with reference to FIG. 1. The vehicle control device 10 authenticates a user U1 who carries a portable key 200 of the vehicle 1 with the portable key 200 to permit the use of the vehicle 1.

Here, the user U1 is a registered user who has been registered as a user of the vehicle 1, and is also referred to as a registered user U1 below. The vehicle control device 10 executes vehicle entry control that permits the registered user U1 to use the vehicle 1 by face authentication. Furthermore, the vehicle control device 10 permits a passenger (unregistered user) who is not registered as a user of the vehicle 1 to use the vehicle by face authentication under predetermined conditions by vehicle entry control. The vehicle entry control is to be described below in detail.

Figure 1:
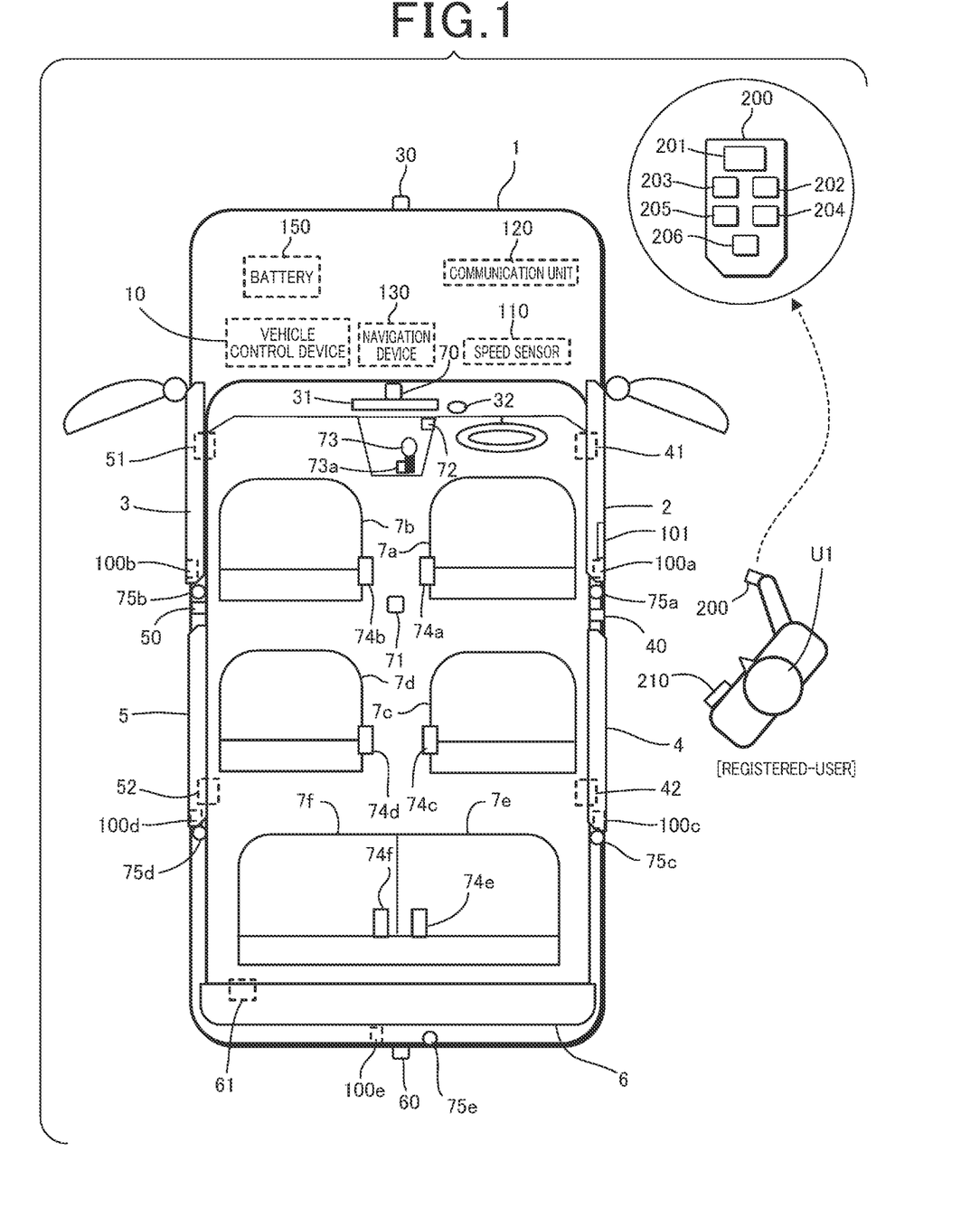
FIG. 1 is a configuration diagram of a vehicle equipped with a vehicle control device.

As shown in FIG. 1, the vehicle 1 is a passenger car having a seating capacity of 6 people, and includes a driver's seat 7a, a front passenger seat 7b, a second row right seat 7c, a second row left seat 7d, a third row right seat 7e, and a third row left seat 7f. Each seat 7a to 7f is provided with seatbelt switches 74a to 74f (not shown) for detecting whether each seatbelt is fastened. In the following, the second row right seat 7c and the second row left seat 7d are also collectively referred to as second row seats, and the third row right seat 7e and the third row left seat 7f are also collectively referred to as third row seats.

The vehicle 1 includes a right power hinge door 2, a left power hinge door 3, a right power slide door 4, a left power slide door 5, and a power tailgate 6. Hereinafter, the right power hinge door 2, the left power hinge door 3, the right power slide door 4, and the left power slide door 5 are also referred to as power doors. The right power slide door 4 and the left power slide door 5 are power doors corresponding to the second row seats and the third row seats.

The door knob of the right power hinge door 2 is provided with a door touch sensor 101, and the user U1 who carries the portable key 200 of the vehicle 1 can unlock the doors 2 to 6 of the vehicle 1 by touching a door touch sensor 101.

The right power hinge door 2 includes a right PHD (Power Hinge Door) drive unit 41 that drives the right power hinge door 2 by an electric actuator (not shown) for opening and closing, and the left power hinge door 3 includes a left PHD drive unit 51 that drives the left power hinge door 3 by an electric actuator for opening and closing. The right power slide door 4 includes a right PSD (Power Slide Door) drive unit 42 that drives the right power slide door 4 by an electric actuator for opening and closing, and the left power slide door 5 includes a left PSD drive unit 52 that drives the left power slide door 5 by an electric actuator for opening and closing. The power tailgate 6 includes a PTG (Power Tail Gate) drive unit 61 that drives the power tailgate 6 by an electric actuator for opening and closing.

A front camera 30 for photographing the front of the vehicle 1 is provided at a front part of the vehicle 1, and a rear camera 60 for photographing the rear of the vehicle 1 is provided at a rear part of the vehicle 1. A right side camera 40 for photographing the right side of the vehicle 1 is provided on a right side part of the vehicle 1, and a left side camera 50 for photographing the left side of the vehicle 1 is provided on a left side part of the vehicle 1.

The dashboard of the vehicle interior is provided with a front-seat camera 70 for photographing users who sit on the driver's seat 7a and the front passenger seat 7b, a display 31, and a speaker 32. On the ceiling of the vehicle interior, there is provided a rear-seat camera 71 for photographing users who sit on the second row right seat 7c, the second row left seat 7d, the third row right seat 7e, and the third row left seat 7f.

The respective doors 2 to 5 are provided with door switches 75a to 75d for detecting the opening and closing of the doors. The power tailgate 6 is also provided with a door switch 75e for detecting the opening and closing of the power tailgate 6. Furthermore, a power switch 72 for instructing on and off of a battery 150 and a shift switch 73a for detecting a shift position of a shift lever 73 are provided near the driver's seat 7a. When the battery 150 is in an on state, power is supplied from the battery 150 to a load 151 (see FIG. 2), and when the battery 150 is in an off state, power supply from the battery 150 to the load is shut off. The load 151 includes an air conditioner (not shown), and an electric motor provided in the vehicle 1.

Furthermore, the vehicle 1 includes: door lock mechanisms 100a to 100e for locking the respective doors 2 to 5 and the power tailgate 6; a speed sensor 110 for detecting a traveling speed of the vehicle 1; a communication unit 120 for communicating with the portable key 200, a registered user terminal 210 used by the registered user U1, and the like; and a navigation device 130. The navigation device 130 has a GPS (Global Positioning System) sensor and map data (not shown), and executes route guidance to a destination based on the position of the vehicle 1 detected by the GPS sensor and the map data.

2. Vehicle Control Device Configuration

A configuration of the vehicle control device 10 is described below with reference to FIG. 2. The vehicle control device 10 includes an ECU (Electronic Control Unit) that is configured with a CPU (Central Processing Unit, which corresponds to a computer of the present invention and is not shown), a memory 80, an interface circuit (not shown), and the like, to control the operation of the vehicle 1.

The vehicle control device 10 receives input of images of the surroundings of the vehicle 1 taken by the front camera 30, the right side camera 40, the left side camera 50, and the rear camera 60. In addition, the vehicle control device 10 receives input of images of the vehicle interior taken by the front-seat camera 70 and the rear-seat camera 71.

Furthermore, the vehicle control device 10 receives input of: detection signals of the power switch 72, the shift switch 73a, the seatbelt switches 74a to 74f, and the door switches 75a to 75e; and lock detection signals for the respective doors 2 to 5 and the power tailgate 6 by door lock sensors (not shown) provided in the door lock mechanisms 100a to 100e.

In addition, the vehicle control device 10 receives input of: a touch detection signal by the door touch sensor 101, a speed detection signal of the speed sensor 110; and information on the current position of the vehicle 1 detected by the navigation device 130.

Control signals output from the vehicle control device 10 control the operation of: the right PHD drive unit 41; the right PSD drive unit 42; the left PHD drive unit 51; the left PSD drive unit 52; the PTG drive unit 61; the door lock mechanisms 100a-100e; and the battery 150. In addition, the control signals output from the vehicle control device 10 control screen display of the display 31, and the sound (voice guidance, chime sound, and so on) output from the speaker 32. The vehicle control device 10 communicates with the portable key 200 carried by the registered user U1 and the registered user terminal 210 (see FIG. 1) used by the registered user U1, via the communication unit 120.

The CPU reads and executes a control program 81 of the vehicle control device 10 stored in the memory 80 to function as: a key authentication unit 11; a communication control unit 12; a power-supply-state recognizing unit 13; a user-candidate-face-image acquiring unit 14; an unregistered-user-getting-on recognizing unit 15; an unregistered-user-face-image acquiring unit 16; a registered-user-information storage unit 17; and a vehicle entry control unit 18. The control program 81 includes a vehicle control program of the present invention. The CPU corresponds to a computer. The memory 80 corresponds to a recording medium. The control program 81 may be recorded on an external recording medium (flash memory, magnetic disk, optical disk, etc.) that can be read and written by a computer, to be transferred from the external recording medium to the memory 80. The memory 80 and the external recording medium are non-transient tangible recording media.

The memory 80 stores an authentication ID code 82 used when the portable key 200 authenticates the user. Furthermore, the memory 80 stores registered-user-information 83 in which information of the registered user of the vehicle 1 is recorded. In the registered-user-information 83, there are recorded: a face image of the registered user U1 for performing face authentication by vehicle entry control; a communication address of the registered user terminal 210 used by the registered user U1; and the like.

A process executed by the user-candidate-face-image acquiring unit 14 corresponds to a user-candidate-face-image acquiring step in a vehicle control method of the present invention, and a process executed by the unregistered-user-getting-on recognizing unit 15 corresponds to an unregistered-user-getting-on recognizing step in the vehicle control method of the present invention. A process executed by the unregistered-user-face-image acquiring unit 16 corresponds to an unregistered-user-face-image acquiring step in the vehicle control method of the present invention, and a process executed by the vehicle entry control unit 18 corresponds to a vehicle entry control step in the vehicle control method of the present invention.

As shown in FIG. 1, when the registered user U1 who carries the portable key 200 approaches the vehicle 1, the key authentication unit 11 communicates with the portable key 200 via the communication unit 120 to receive an ID code from the portable key 200. Then, when the received ID code equals the authentication ID code 82 stored in the memory 80, the key authentication unit 11 permits the registered user U1 to use the vehicle 1. As a result, the registered user U1 can operate the vehicle 1. In addition, another user to whom the registered user U1 have lent the portable key 200 can also use the vehicle 1 by carrying the portable key 200.

As shown in FIG. 1, the portable key 200 includes: a lock-unlock button 201 for instructing locking and unlocking of the vehicle 1; a right power hinge door button 202 for instructing opening and closing of the right power hinge door 2; a left power hinge door button 203 for instructing opening and closing of the left power hinge door 3; a right power slide door button 204 for instructing opening and closing of the right power slide door 4; a left power slide door button 205 for instructing opening and closing of the left power slide door 5; and a power tail gate button 206 for instructing the opening and closing of the power tailgate 6.

The registered user U1 can operate the lock-unlock button 201 of the portable key 200 to unlock the respective doors 2 to 6 of the vehicle 1 and get on the vehicle 1. In addition, the registered user U1 can operate the buttons 202 to 206 of the portable key 200 to instruct the vehicle 1 to open and close the power doors. The user U1 who carries the portable key 200 and gets on the vehicle 1 turns on the power switch 72 to start the vehicle 1 and starts using the vehicle 1.

The communication control unit 12 controls communication with the registered user terminal 210 (see FIG. 1) via the communication unit 120. The power-supply-state recognizing unit 13 recognizes whether the battery 150 is in the on state or the off state in response to the operation of the power switch 72. Note that the electric power output from the battery 150 to the load 151 may be detected for recognizing whether the battery 150 is in the on state or the off state.

3. Vehicle Entry Control for Registered User

The vehicle entry control for the registered user U1 is described with reference to FIG. 3. The vehicle entry control is executed by the vehicle entry control unit 18. The vehicle entry control unit 18 uses the face image of a user candidate present in surroundings of the vehicle 1 (user-candidate-face-image) acquired by the user-candidate-face-image acquiring unit 14 to perform face authentication of the registered user U1.

The user-candidate-face-image acquiring unit 14 extracts the face image of a person present in surroundings of the vehicle 1 from the image taken by the right side camera 40 and the image taken by the left side camera 50 to acquire the face image of a user candidate who has approached the vehicle 1 (user-candidate-face-image). In FIG. 3, Ar1 is the photographing range of the right side camera 40, and Ar2 is the photographing range of the left side camera 50. Note that the human face image may be extracted from the images taken by the front camera 30 and the rear camera 60 to acquire the user-candidate-face-image.

Figure 3:
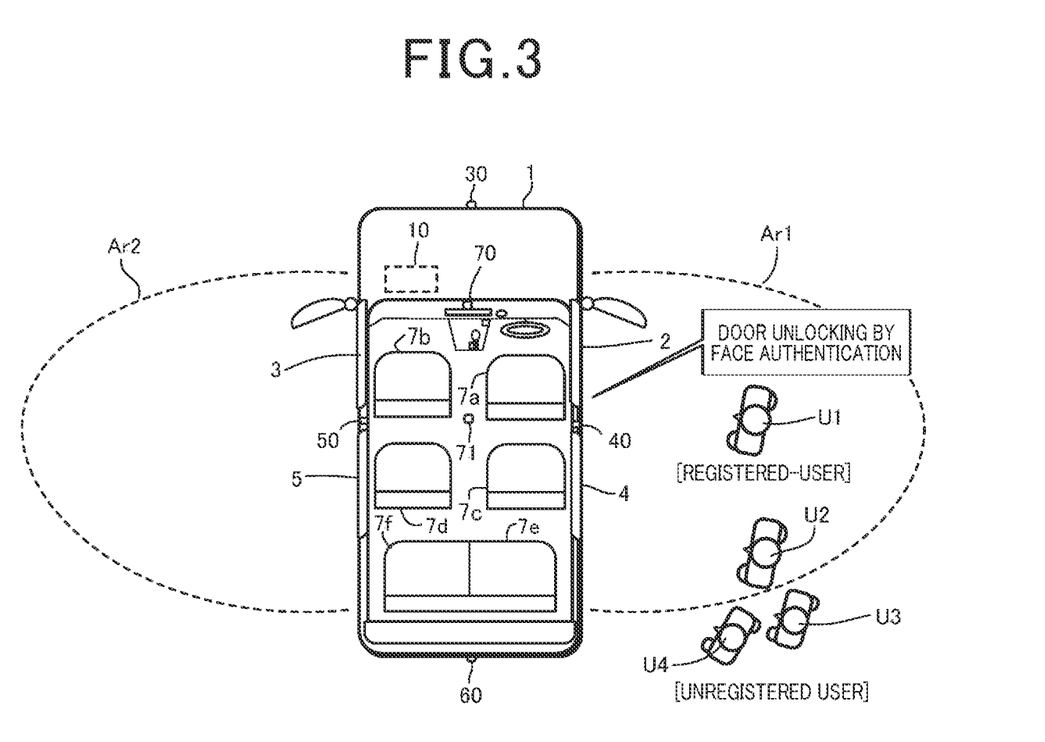
FIG. 3 is an explanatory diagram of an entry aspect to a vehicle by face authentication for a registered user.

FIG. 3 shows a situation in which the registered user U1 and unregistered users U2, U3, and U4 who are not registered as users of the vehicle 1 approach the vehicle 1 in order to get on the vehicle 1. In this situation, the registered user U1 and the unregistered user U2 are photographed by the right side camera 40, and the user-candidate-face-image acquiring unit 14 acquires the face image of the registered user U1 and the face image of the unregistered user U2 as user-candidate-face-images.

The vehicle entry control unit 18 compares the face images of the registered user U1 and the unregistered user U2 with the registered user face image, which is an authentication-face-image of the registered user U1 recorded in the registered-user-information 83. Then, when the matching rate (corresponding to a matching degree of the present invention) between the face image of the registered user U1 and the authentication-face-image is equal to or higher than a second determination level (for example, 90%), the vehicle entry control unit 18 permits entry to the vehicle 1.

That is, the vehicle entry control unit 18 sets the vehicle 1 to a second entry-enabled-state in which the power door of the vehicle 1 is unlocked and the running operation of vehicle 1 is enabled. As a result, the registered user U1 can get on the vehicle 1 and turn on the power switch 72 to run the vehicle 1. Note that the matching degree of the face images used may be a difference in a feature amount or the like as well as the matching rate.

On the other hand, the matching rate between the face image of the unregistered user U2, which is acquired as the user-candidate-face-image, and the registered-user-face-image (the authentication-face-image of the registered user U1), which is recorded in the registered-user-information 83, is lower than the second determination level. Therefore, the vehicle entry control unit 18 does not permit entry to the vehicle 1 for the unregistered user U2. The same applies when the face images of the unregistered users U3 and U4 are acquired by the user-candidate-face-image acquiring unit 14. After the vehicle entry control unit 18 permits entry to the vehicle 1 for the registered user U1 and unlocks the power door of the vehicle 1, the unregistered users U2 to U4 get on the vehicle 1.

4. Vehicle Entry Control for Unregistered Users

Figure 4:
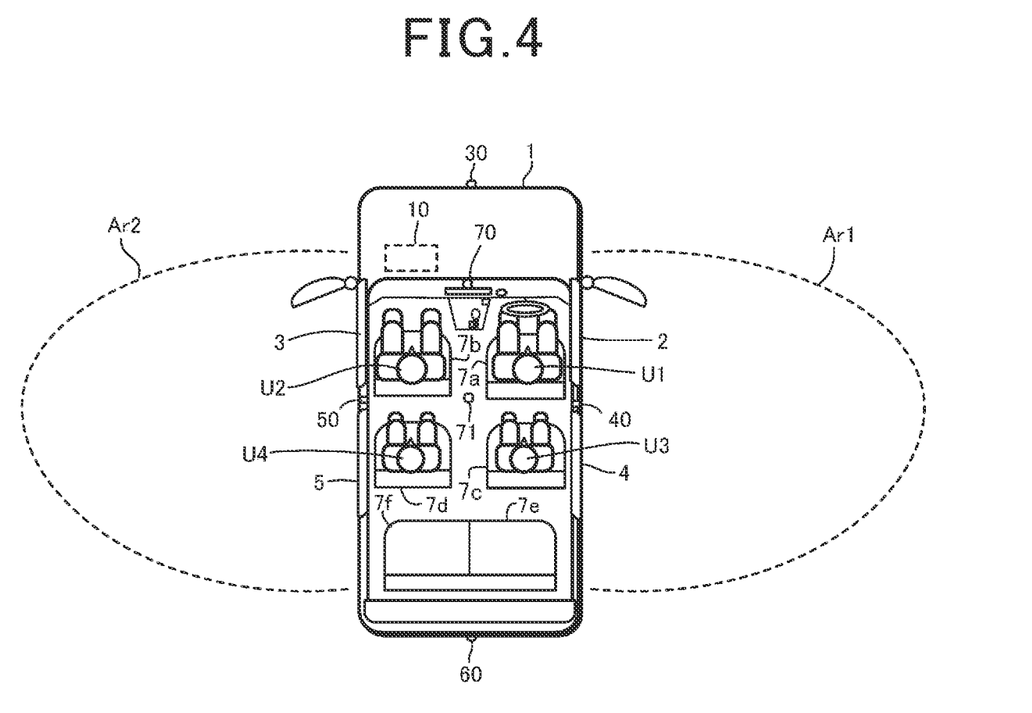
FIG. 4 is an explanatory diagram of a situation in which a registered user and unregistered users get on a vehicle.

Vehicle entry control for the unregistered users U2 to U4 is described with reference to FIGS. 4 and 5 according to flowcharts shown in FIGS. 6 to 7. As shown in FIG. 4, the vehicle entry control unit 18 executes control to temporarily permit entry to the vehicle 1 for the unregistered users U2 to U4 who get off from vehicle 1, as vehicle entry control for the unregistered users U2 to U4 riding together on vehicle 1.

Figure 6:
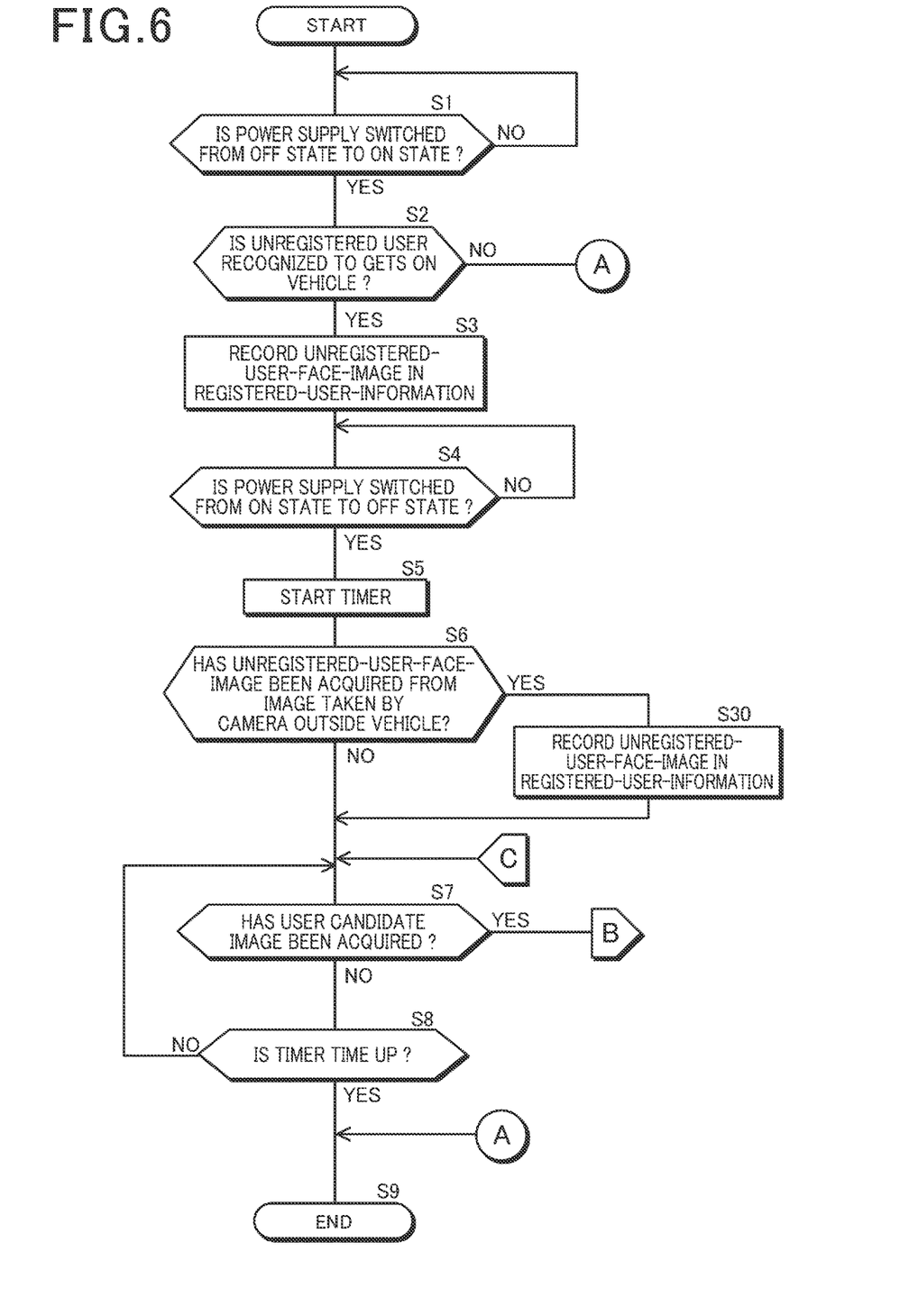
FIG. 6 is a first flowchart of vehicle entry control for unregistered users.

Steps S1 to S3 of FIG. 6 are processes by the unregistered-user-getting-on recognizing unit 15. The unregistered-user-getting-on recognizing unit 15 advances the process to step S2 when the power-supply-state recognizing unit 13 recognizes that the power supply 150 is switched from the off state to the on state in step S1. Then, the unregistered-user-getting-on recognizing unit 15 determines whether an unregistered user other than the registered user U1 (the unregistered users U2 to U4 in FIG. 4) gets on the vehicle 1, from the image taken by the front-seat camera 70 or the rear-seat camera 71.

When an unregistered user gets on the vehicle 1, the unregistered-user-getting-on recognizing unit 15 advances the process to step S3. On the other hand, when no unregistered user gets on the vehicle 1, the unregistered-user-getting-on recognizing unit 15 advances the process to step S9, and in this case, the vehicle entry control for the unregistered user is not executed.

Step S3 is a process by the unregistered-user-face-image acquiring unit 16 and the registered-user-information storage unit 17. The unregistered-user-face-image acquiring unit 16 extracts the face images of the unregistered users (face images of the unregistered users U2 to U4 in FIG. 4) from the image taken by the front-seat camera 70 or the rear-seat camera 71, and acquires the face images as unregistered-user-face-images. The registered-user-information storage unit 17 records and stores unregistered-user-face-images, acquired by the unregistered-user-face-image acquiring unit 16, in the registered-user-information 83. As a result, the unregistered-user-face-images and the information of the registered user terminal are associated with each other and stored in the memory 80.

Subsequent steps S4 to S6 are processes by the vehicle entry control unit 18. In step S4, when the power-supply-state recognizing unit 13 recognizes that the power supply 150 is switched from the on state to the off state, the vehicle entry control unit 18 advances the process to step S5 to start a timer. A set time of the timer is set to, for example, 30 minutes. The set time of the timer corresponds to a predetermined time of the present invention.

Note that the power-supply-state recognizing unit 13 determines that the power supply 150 is switched from the on state to the off state in order to recognize that the use of the vehicle 1 has ended. In addition to the fact the power supply 150 is switched from the on state to the off state, or in place of the fact that the power supply 150 is switched from the on state to the off state, the fact that the use of the vehicle 1 has ended may be recognized from the following facts that: the speed sensor 110 detects that the vehicle 1 is stopped; the shift switch 73*a* detects that the shift lever 73 is in the parking position; the door switches 75*a* to 75*d* detects that the power door is opened and closed; the seatbelt switches 74*a*-74*f* detect that the seatbelts are removed; the lock sensors of the door lock mechanisms 100*a* to 100*d* detect that the power doors are locked after being unlocked; or the like.

Subsequent steps S6 and S30 are processes by the unregistered-user-face-image acquiring unit 16 and the registered-user-information storage unit 17. In step S6, the unregistered-user-face-image acquiring unit 16 searches for an unregistered-user-face-image from the images taken by the cameras outside the vehicle (the right side camera 40 and the left side camera 50), and it advances the process to step S30 when an unregistered-user-face-image is acquired. On the other hand, when the unregistered-user-face-image acquiring unit 16 does not acquire any unregistered-user-face-image from the image taken by the camera outside the vehicle, it advances the process from step S6 to step S7.

When the matching rate between the face image extracted from the images taken by the cameras outside the vehicle and the unregistered-user-face-image recorded in the registered-user-information 83 in step S3 is equal to or higher than a predetermined adoption determination level, the unregistered-user-face-image acquiring unit 16 determines that the extracted face image is a face image of the unregistered user, and acquires it as an unregistered-user-face-image.

In step S30, the registered-user-information storage unit 17 adds the unregistered-user-face-image, which is acquired by the unregistered-user-face-image acquiring unit 16 in step S6, to the registered-user-information 83 and records it, or replaces it with the unregistered-user-face-image already recorded in step S3. Then, the registered-user-information storage unit 17 advances the process to step S7.

The processes after step S7 are processes by the vehicle entry control unit 18. With loop processing of step S7 and step S8, the vehicle entry control unit 18 determines whether the user-candidate-face-image acquiring unit 14 has acquired a user-candidate-face-image in step S7 until the timer time is up in step S8. Then, when a user-candidate-face-image is acquired, the vehicle entry control unit 18 advances the process to step S40 of FIG. 7.

Figure 7:
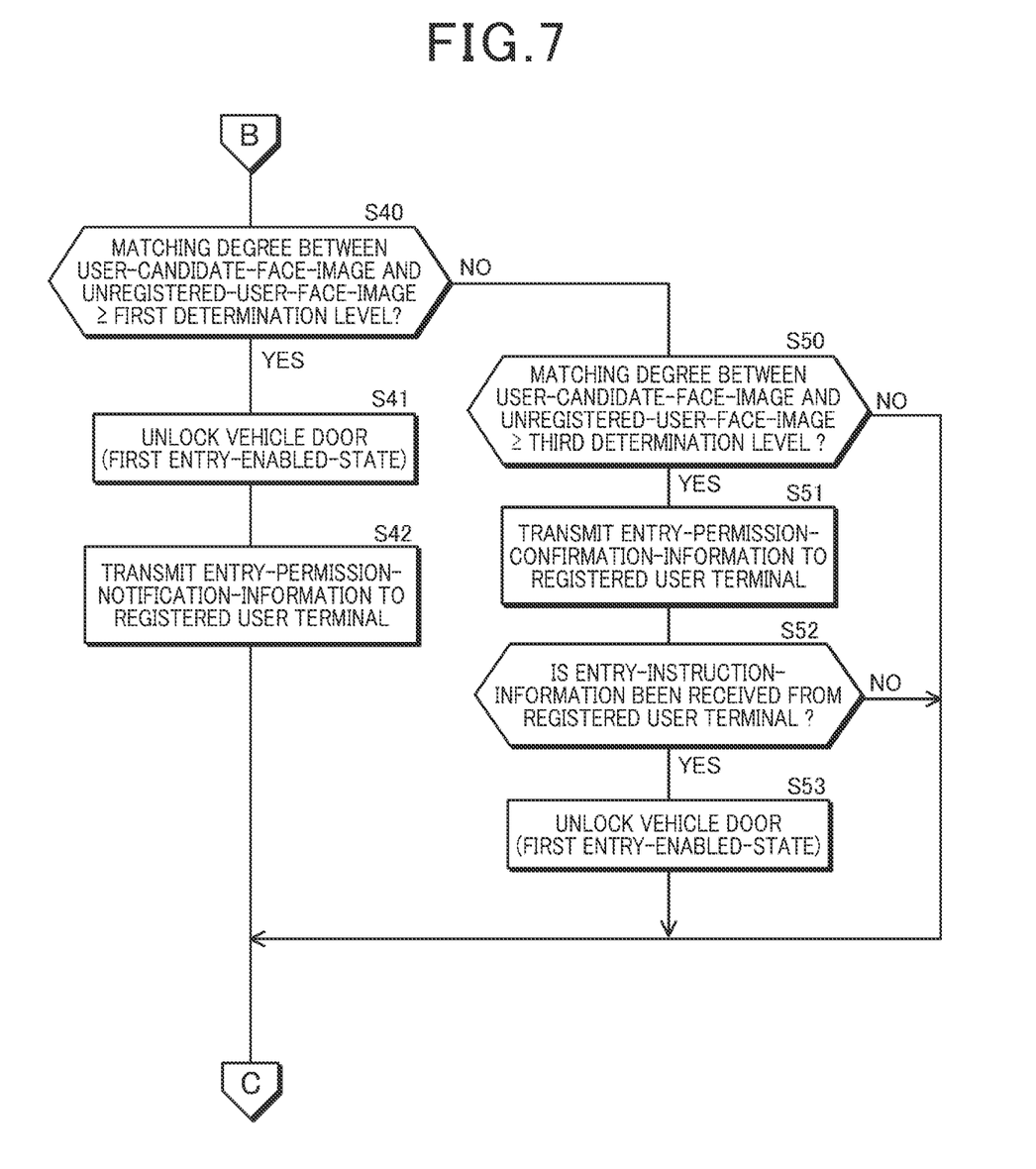
FIG. 7 is a second flowchart of vehicle entry control for unregistered users.

In step S40 of FIG. 7, the vehicle entry control unit 18 determines whether the matching rate between the user-candidate-face-image acquired by the user-candidate-face-image acquiring unit 14 and the unregistered-user-face-image recorded in the registered-user-information 83 is equal to or higher than a first determination level (for example, 90%). Then, when the matching rate between the user-candidate-face-image and the unregistered-user-face-image is equal to or higher than the first determination level, the vehicle entry control unit 18 advances the process to step S41, and when the matching rate between the user-candidate-face-image and the unregistered-user-face-image is lower than the first determination level, it advances the process to step S50.

In step S41, the vehicle entry control unit 18 set the vehicle 1 to a first entry-enabled-state in which the power door of the vehicle 1 is unlocked, and the running operation of the vehicle 1 is disabled. In the first entry-enabled-state, the unregistered user can open the unlocked power door to get on the vehicle 1, and can lock the power door when getting off the vehicle 1. However, operation necessary for running the vehicle 1, such as turning on the power switch 72, are in a disabled state.

Figure 5:
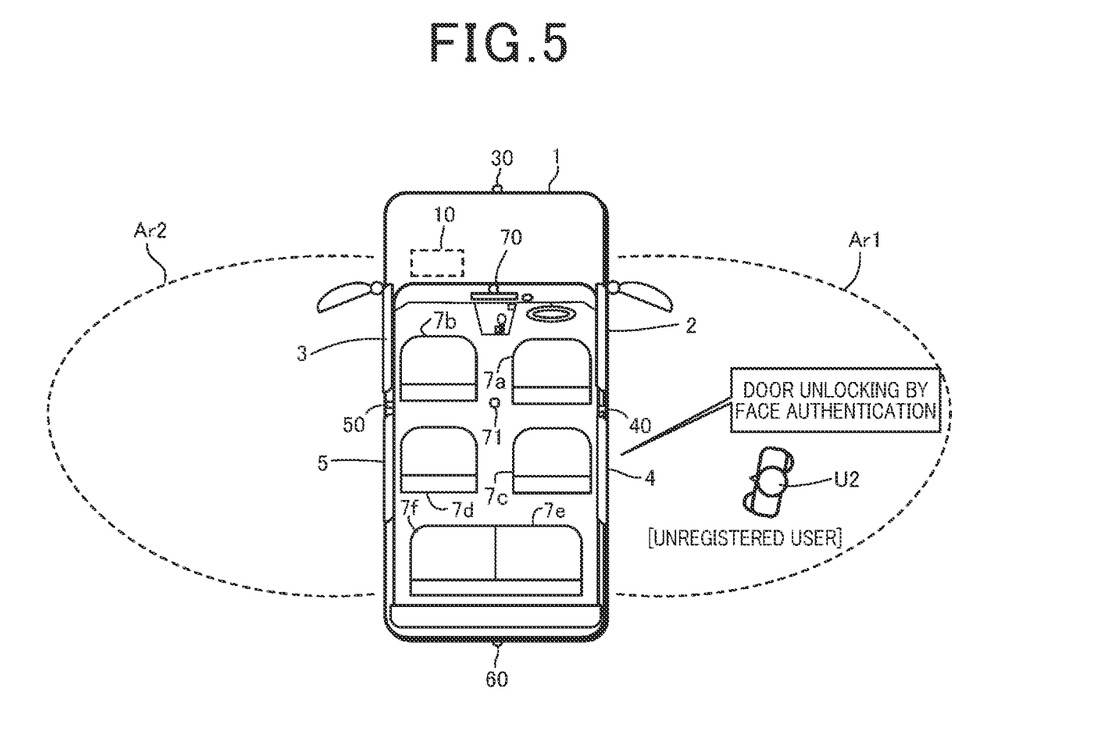
FIG. 5 is an explanatory diagram of an entry aspect to a vehicle by face authentication for an unregistered user.

FIG. 5 shows a situation in which the unregistered user U2 returns to pick up an object left behind in the interior of the vehicle 1 after getting off the vehicle 1. In this situation, the user-candidate-face-image acquiring unit 14 acquires the face image of the unregistered user U2 as the user-candidate-face-image. Then, the vehicle entry control unit 18 determines that the matching rate between the user-candidate-face-image and the unregistered-user-face-image of the unregistered user U2, which is recorded in the registered-user-information 83, is equal to or higher than the first determination level, so that the power door of the vehicle 1 is unlocked. As a result, the unregistered user U2 can open the power door of the vehicle 1 and enter the vehicle interior. However, the unregistered user U2 cannot turn on the power switch 72 to run the vehicle 1.

In the next step S42, the vehicle entry control unit 18 transmits an entry-permission-notification-information that notifies that the vehicle 1 is in the first entry state, to the registered user terminal 210 via the communication control unit 12 and the communication unit 120. The entry-permission-notification-information includes the unregistered-user-face-image recorded in the registered-user-information 83, or the user-candidate-face-image whose matching rate with the unregistered-user-face-image is determined to be equal to or higher than the first determination level in step S40. Then, the vehicle entry control unit 18 advances the process to step S7 of FIG. 6.

In the example of FIG. 5, entry-permission-notification-information including a face image of the unregistered user U2 (the unregistered-user-face-image of the U2 recorded in the registered-user-information 83, or the user-candidate-face-image whose matching rate with the unregistered-user-face-image is determined to be equal to or higher than a first determination level in step S40) is sent to the registered user terminal 210. The registered user U1 visually recognizes the face image of the unregistered user U2 displayed on the display of the registered user terminal 210 to enable recognizing that the unregistered user U2 is permitted to get on the vehicle 1.

In step S50, the vehicle entry control unit 18 determines whether the matching rate between the user-candidate-face-image acquired by the user-candidate-face-image acquiring unit 14 and the unregistered-user-face-image recorded in the registered-user-information 83 is equal to or higher than the third determination level (for example, 60%). Then, when the matching rate between the user-candidate-face-image and the unregistered-user-face-image is equal to or higher than the third determination level, the vehicle entry control unit 18 advances the process to step S51, and when the matching rate between the user-candidate-face-image and the unregistered-user-face-image is lower than the third determination level, it advances the process to step S7 of FIG. 6.

In step S51, the vehicle entry control unit 18 transmits entry-permissibility-confirmation-information to the registered user terminal 210 via the communication control unit 12 and the communication unit 120. The entry-permissibility-confirmation-information includes the user-candidate-face-image, whose matching rate with the unregistered-user-face-image is determined to be equal to or higher than the third determination level in step S50, and is an inquiry on whether the vehicle 1 is to be set to the first entry-enabled-state.

The registered user terminal 210, which has received the entry-permissibility-confirmation-information, displays the user-candidate-face-image on the display unit and displays an entry-confirmation-screen on the display unit that prompts an instruction on whether or not the entry is permitted. The registered user U1 visually recognizes the entry-confirmation-screen by the registered user terminal 210, and determines whether to permit entry to the vehicle 1 for the unregistered user identified by the user-candidate-face-image. Then, when the registered user U1 permits entry to the vehicle 1 for the unregistered user, the registered user U1 transmits entry-instruction-information to the vehicle control device 10 of the vehicle 1.

When the vehicle entry control unit 18 receives the entry-instruction-information from the registered user terminal 210, it advances the process from step S52 to step S53. Then, the vehicle entry control unit 18 unlocks the power door of the vehicle 1 to set the vehicle 1 to the first entry-enabled-state, and advances the process to step S7 of FIG. 6.

As described above, the vehicle entry control unit 18 records the unregistered-user-face-image in the registered-user-information 83 for the unregistered user riding together in the vehicle 1 to permit the entry to the vehicle 1 by face authentication from the time when the use of the vehicle 1 ends to the time when a predetermined time elapses. As a result, if the unregistered user does not carry the portable key 200 of the vehicle 1 or is not accompanied by the registered user U1, the unregistered user can unlock the power door of vehicle 1 by face authentication and collect the thing left behind.

5. Other Embodiments

In the above embodiment, with the processes of step S6 and step S7 of FIG. 6, the unregistered-user-face-image acquiring unit 16 acquires the unregistered-user-face-image also from the image taken by the camera outside the vehicle, and the registered-user-information storage unit 17 records the unregistered-user-face-image acquired from the image taken by the camera outside the vehicle in the registered-user-information 83. Another embodiment may be such that the processes of steps S6 and S7 are omitted and only the unregistered-user-face-image acquired from the images taken by the cameras inside the vehicle (front-seat camera 70, and rear-seat camera 71) are used.

Alternatively, the unregistered-user-face-image may be acquired from an image taken by another camera instead of the camera provided in the vehicle 1. For example, an image of an unregistered user taken by a camera provided in an unregistered user terminal used by an unregistered user is received from the unregistered user terminal, and the unregistered-user-face-image may be acquired from the received image of the unregistered user.

In the above embodiment, in step S42 of FIG. 7, the vehicle entry control unit 18 transmits to the registered user terminal 210, but the process of step S42 may be omitted.

In the above embodiment, in steps S50 to S53 of FIG. 7, when a matching rate between the user-candidate-face-image and the unregistered-user-face-image is lower than the first determination level and equal to or higher than the third determination level, the entry-permission-confirmation-information is transmitted to the registered user terminal 210, and the registered user U1 is inquired on whether the vehicle 1 is to be set to the first entry state. Another embodiment may be such that: the processes of steps S50 to S53 is omitted; and when a matching rate between the user-candidate-face-image and the unregistered-user-face-image is lower than the first determination level, the vehicle 1 is prohibited to be set to the first entry state.

In the above embodiment, the unregistered-user-getting-on recognizing unit 15 determines whether an unregistered user other than the registered user U1 has got on the vehicle 1 when the power-supply-state recognizing unit 13 recognizes that the power supply 150 is switched from the off state to the on state. Another embodiment may be such that: there is provided a running speed recognizing unit that recognizes a running speed of the vehicle 1 from the detection signal of the speed sensor 110; and the unregistered-user-getting-on recognizing unit 15 recognizes that the unregistered user gets on the vehicle, after the vehicle is recognized to have started running based on the running speed of the vehicle, which is recognized by the running speed recognizing unit. Alternatively, the unregistered-user-getting-on recognizing unit 15 may recognize that the unregistered user gets on the vehicle when it recognizes that the unregistered user stays in the interior of the vehicle 1 for a predetermined time (for example, 3 minutes) or longer based on the images taken by the cameras inside the vehicle.

Figure 2:
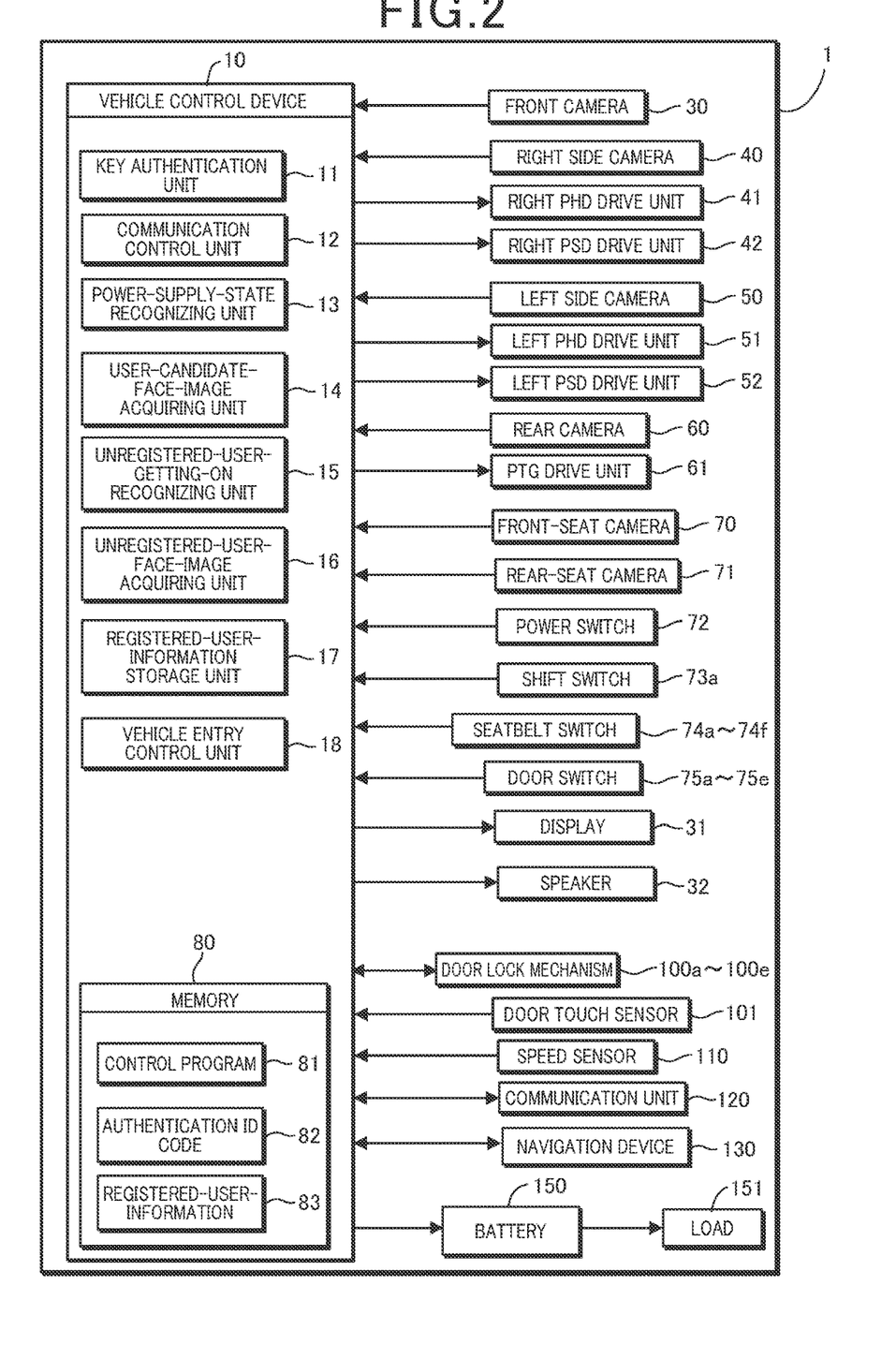
FIG. 2 is a configuration diagram of the vehicle control device.

Note that, FIGS. 1 and 2 are schematic diagrams showing the configurations of the vehicle 1 and the vehicle control device 10 classified according to what is mainly in the process in order to facilitate understanding of the invention of the application, and the configurations of the vehicle 1 and the vehicle control device 10 may be configured by other classification. In addition, the process of each component may be executed by one hardware unit, or may be executed by a plurality of hardware units. In addition, the process by each component shown in FIGS. 6 to 7 may be executed by one program or may be executed by a plurality of programs.

6. Configurations Supported by the Above Embodiments

The above embodiments are specific examples of the following configurations.

Item 1

A vehicle control device, including: a user-candidate-face-image acquiring unit that acquires a user-candidate-face-image from a surrounding image of a vehicle, the user-candidate-face-image being a face image of a user candidate of the vehicle, the user candidate of the vehicle being present in surroundings of the vehicle, the surrounding image of the vehicle being taken by a camera provided in the vehicle; an unregistered-user-getting-on recognizing unit that recognizes that an unregistered user gets on the vehicle, the unregistered user not being registered as a user for the vehicle; an unregistered-user-face-image acquiring unit that acquires an unregistered-user-face-image when the unregistered-user-getting-on recognizing unit recognizes that the unregistered user gets on the vehicle, the unregistered-user-face-image being a face image of the unregistered user; and a vehicle entry control unit that sets the vehicle to a first entry-enabled-state when a matching degree between the user-candidate-face-image and the unregistered-user-face-image is equal to or higher than a first determination level, after the unregistered-user-getting-on recognizing unit recognizes that the unregistered user gets on the vehicle until a predetermined time elapses, the user-candidate-face-image being acquired by the user-candidate-face-image acquiring unit.

According to the vehicle control device of item 1, when the unregistered user gets on the vehicle, the unregistered-user-face-image acquiring unit acquires the unregistered-user-face-image. Then, after the unregistered user is recognized to get on the vehicle until the predetermined time elapses, when the matching degree between the user-candidate-face-image, which is acquired by the user-candidate-face-image acquiring unit, and the unregistered-user-face-image is equal to or higher than the first determination level, the vehicle entry control unit sets the vehicle to the first entry-enabled-state.

As a result, entry to the vehicle is enabled for passengers other than registered users.

Item 2

The vehicle control device according to item 1, wherein: the vehicle entry control unit sets the vehicle to a second entry-enabled-state when a matching degree between the user-candidate-face-image and an authentication-face-image of a registered user is equal to or higher than a second determination level, the second entry-enabled-state being a state in which a door of the vehicle is unlocked and running operation of the vehicle is enabled, the user-candidate-face-image being acquired by the user-candidate-face-image acquiring unit, the registered user having been registered as a user for the vehicle; and the first entry-enabled-state is a state in which a door of the vehicle is unlocked and running operation of the vehicle is disabled.

According to the vehicle control device of item 2, the registered user is permitted to unlock the vehicle door and operate the vehicle for running, whereas unregistered users are permitted to unlock the vehicle door but are prohibited from operating the vehicle for running. As a result, the use of the vehicle can be restricted to the unregistered users.

Item 3

The vehicle control device according to item 1 or 2 wherein, when a face image of the unregistered user is extracted from a surrounding image of the vehicle, the unregistered-user-face-image acquiring unit acquires the extracted face image of the unregistered user as the unregistered-user-face-image, the surrounding image being taken by the camera.

According to the vehicle control device of item 3, the face image of the unregistered user is taken by the camera in a situation close to when the unregistered user who gets off the vehicle and then returns to the vehicle, and such a face image can be used as the authentication-face-image of the unregistered user. As a result, the authentication accuracy of the unregistered user can be improved.

Item 4

The vehicle control device according to any one of items 1 to 3, including a power-supply-state recognizing unit that recognizes a power supply state of the vehicle, wherein the unregistered-user-getting-on recognizing unit recognizes that the unregistered user gets on the vehicle, after the power-supply-state recognizing unit recognizes that the power supply is shifted from an on state to an off state.

According to the vehicle control device of item 4, when the power supply is shifted from the on state to the off state and the use of the vehicle is expected to end, the face image of the unregistered user, which is taken by a first camera in a situation close to when the unregistered user returns to the vehicle, can be used as the authentication-face-image of the unregistered user.

Item 5

The vehicle control device according to any one of items 1 to 4, including a running speed recognizing unit that recognizes a running speed of the vehicle, wherein the unregistered-user-getting-on recognizing unit recognizes that the unregistered user gets on the vehicle, after the vehicle is recognized to have started running based on the running speed of the vehicle, the running speed being recognized by the running speed recognizing unit.

According to the vehicle control device of item 5, unregistered users are recognized to get on the vehicle after the vehicle starts running, so that it is possible to prevent, for example, a service worker or the like, who inspects the vehicle before the vehicle starts running, from being permitted to gain entry to the vehicle.

Item 6

The vehicle control device according to any one of items 1 to 5, wherein the unregistered-user-getting-on recognizing unit recognizes that the unregistered user gets on the vehicle when the unregistered-user-getting-on recognizing unit recognizes that the unregistered user stays in a vehicle interior for a predetermined time or longer.

According to the vehicle control device of item 6, it is possible to prevent, for example, a salesperson, who temporarily gets on the vehicle to deliver food and drink to the vehicle, from being permitted to gain entry to the vehicle.

Item 7

The vehicle control device according to any one of items 1 to 4, including: a communication control unit that communicates with a registered user terminal used by a registered user who has been registered as a user for the vehicle; and a registered-user-information storage unit that stores registered-user-information in a storage unit, the registered-user-information being information in which the unregistered-user-face-image and information of the registered user terminal are associated with each other, wherein, when a matching degree between the user-candidate-face-image and the unregistered-user-face-image is equal to or higher than the first determination level so that the vehicle entry control unit sets the vehicle to the first entry-enabled-state, the vehicle entry control unit acquires information of the registered user terminal with reference to the registered user information so that the vehicle entry control unit transmits entry permission notification information to the registered user terminal via the communication control unit, the usercandidate-face-image being acquired by the user-candidate-face-image acquiring unit, the entry permission notification information including the unregistered-user-face-image or the user-candidate-face-image, the entry-permission-notification-information notifying that the vehicle is set to the first entry-enabled-state.

According to the vehicle control device of item 7, it is possible to notify the registered user that the unregistered user is permitted to gain entry to the vehicle.

Item 8

The vehicle control device according to item 5, wherein, when a matching degree between the user-candidate-face-image and the unregistered-user-face-image is lower than the first determination level and equal to or higher than a third determination level, the vehicle entry control unit transmits entry-permissibility-confirmation-information to the registered user terminal via the communication control unit, the user-candidate-face-image being acquired by the user-candidate-face-image acquiring unit, the entry-permissibility-confirmation-information including the user-candidate-face-image, the entry-permissibility-confirmation-information inquiring whether the vehicle is to be set to the first entry-enabled-state.

According to the vehicle control device of item 8, when the recognition accuracy degree of the unregistered user is low, the entry-permissibility-confirmation-information is transmitted to the registered user terminal, so that it is possible to entrust the registered user to determine whether to permit the unregistered user to gain entry to the vehicle.

Item 9

A vehicle control method executed by a computer, the method including: a user-candidate-face-image acquiring step that acquires a user-candidate-face-image from a surrounding image of a vehicle, the user-candidate-face-image being a face image of a user candidate of the vehicle, the user candidate of the vehicle being present in surroundings of the vehicle, the surrounding image of the vehicle being taken by a camera provided in the vehicle; an unregistered-user-getting-on recognizing step that recognizes that an unregistered user gets on the vehicle, the unregistered user not being registered as a user for the vehicle; an unregistered-user-face-image acquiring step that acquires an unregistered-user-face-image when the unregistered-user-getting-on recognizing step recognizes that the unregistered user gets on the vehicle, the unregistered-user-face-image being a face image of the unregistered user; and a vehicle entry control step that sets the vehicle to a first entry-enabled-state when a matching degree between the user-candidate-face-image and the unregistered-user-face-image is equal to or higher than a first determination level, after the unregistered-user-getting-on recognizing step recognizes that the unregistered user gets on the vehicle until a predetermined time elapses, the user-candidate-face-image being acquired by the user-candidate-face-image acquiring step.

Executing the vehicle control method of item 9 by the computer enables obtaining the same function effect as the vehicle control device of item 1.

Item 10

A non-transient recording medium on which a vehicle control program is recorded, the vehicle control program causing a computer to function as: a user-candidate-face-image acquiring unit that acquires a user-candidate-face-image from a surrounding image of a vehicle, the user-candidate-face-image being a face image of a user candidate of the vehicle, the user candidate of the vehicle being present in surroundings of the vehicle, the surrounding image of the vehicle being taken by a camera provided in the vehicle; an unregistered-user-getting-on recognizing unit that recognizes that an unregistered user gets on the vehicle, the unregistered user not being registered as a user for the vehicle; an unregistered-user-face-image acquiring unit that acquires an unregistered-user-face-image when the unregistered-user-getting-on recognizing unit recognizes that the unregistered user gets on the vehicle, the unregistered-user-face-image being a face image of the unregistered user; and a vehicle entry control unit that sets the vehicle to a first entry-enabled-state when a matching degree between the user-candidate-face-image and the unregistered-user-face-image is equal to or higher than a first determination level, after the unregistered-user-getting-on recognizing unit recognizes that the unregistered user gets on the vehicle until a predetermined time elapses, the user-candidate-face-image being acquired by the user-candidate-face-image acquiring unit.

Causing the computer to execute the vehicle control program of the item 10 can realize the configuration of the vehicle control device of item 1.

REFERENCE SIGNS LIST 1 vehicle
2 right power hinge door
3 left power hinge door
4 right power slide door
5 left power slide door
6 power tailgate
10 vehicle control device
11 key authentication unit
12 communication control unit
13 power-supply-state recognizing unit
14 user-candidate-face-image acquiring unit
15 unregistered-user-getting-on recognizing unit
16 unregistered-user-face-image acquiring unit
17 registered-user-information storage unit
18 vehicle entry control unit
80 memory
81 control program
82 authentication ID code
83 registered-user-information
210 registered user terminal

What is claimed is:

1. A vehicle control device, comprising a central processing unit (CPU) configured to function as:
   a user-candidate-face-image acquiring unit that acquires a user-candidate-face-image from a surrounding image of a vehicle, the user-candidate-face-image being a face image of a user candidate of the vehicle, the user candidate of the vehicle being present in surroundings of the vehicle, the surrounding image of the vehicle being taken by a camera provided in the vehicle;
   an unregistered-user-getting-on recognizing unit that recognizes that an unregistered user gets on the vehicle, the unregistered user not being registered as a user for the vehicle;
   an unregistered-user-face-image acquiring unit that acquires an unregistered-user-face-image when the unregistered-user-getting-on recognizing unit recognizes that the unregistered user gets on the vehicle, the unregistered-user-face-image being a face image of the unregistered user; and
   a vehicle entry control unit that sets the vehicle to a first entry-enabled-state when a matching degree between the user-candidate-face-image and the unregistered-user-face-image is equal to or higher than a first determination level, after the unregistered-user-getting-on recognizing unit recognizes that the unregistered user gets on the vehicle until a predetermined time elapses, the user-candidate-face-image being acquired by the user-candidate-face-image acquiring unit.

2. The vehicle control device according to claim 1, wherein
the vehicle entry control unit sets the vehicle to a second entry-enabled-state when a matching degree between the user-candidate-face-image and an authentication-face-image of a registered user is equal to or higher than a second determination level, the second entry-enabled-state being a state in which a door of the vehicle is unlocked and running operation of the vehicle is enabled, the user-candidate-face-image being acquired by the user-candidate-face-image acquiring unit, the registered user having been registered as a user for the vehicle, and
the first entry-enabled-state is a state in which a door of the vehicle is unlocked and running operation of the vehicle is disabled.

3. The vehicle control device according to claim 1, wherein
when a face image of the unregistered user is extracted from a surrounding image of the vehicle, the unregistered-user-face-image acquiring unit acquires the extracted face image of the unregistered user as the unregistered-user-face-image, the surrounding image being taken by the camera.

4. The vehicle control device according to claim 1, the CPU is further configured to function as:
a power-supply-state recognizing unit that recognizes a power supply state of the vehicle,
wherein the unregistered-user-getting-on recognizing unit recognizes that the unregistered user gets on the vehicle, after the power-supply-state recognizing unit recognizes that the power supply is shifted from an on state to an off state.

5. The vehicle control device according to claim 1, the CPU is further configured to function as:
a running speed recognizing unit that recognizes a running speed of the vehicle,
wherein the unregistered-user-getting-on recognizing unit recognizes that the unregistered user gets on the vehicle, after the vehicle is recognized to have started running based on the running speed of the vehicle, the running speed being recognized by the running speed recognizing unit.

6. The vehicle control device according to claim 1, wherein
the unregistered-user-getting-on recognizing unit recognizes that the unregistered user gets on the vehicle when the unregistered-user-getting-on recognizing unit recognizes that the unregistered user stays in a vehicle interior for a predetermined time or longer.

7. The vehicle control device according to claim 1, the CPU is further configured to function as:
a communication control unit that communicates with a registered user terminal used by a registered user who has been registered as a user for the vehicle; and
a registered-user-information storage unit that stores registered-user-information in a storage unit, the registered-user-information being information in which the unregistered-user-face-image and information of the registered user terminal are associated with each other,
wherein, when a matching degree between the user-candidate-face-image and the unregistered-user-face-image is equal to or higher than the first determination level so that the vehicle entry control unit sets the vehicle to the first entry-enabled-state, the vehicle entry control unit acquires information of the registered user terminal with reference to the registered user information so that the vehicle entry control unit transmits entry permission notification information to the registered user terminal via the communication control unit, the user-candidate-face-image being acquired by the user-candidate-face-image acquiring unit, the entry permission notification information including the unregistered-user-face-image or the user-candidate-face-image, the entry-permission-notification-information notifying that the vehicle is set to the first entry-enabled-state.

8. The vehicle control device according to claim 7, wherein
when a matching degree between the user-candidate-face-image and the unregistered-user-face-image is lower than the first determination level and equal to or higher than a third determination level, the vehicle entry control unit transmits entry-permissibility-confirmation-information to the registered user terminal via the communication control unit, the user-candidate-face-image being acquired by the user-candidate-face-image acquiring unit, the entry-permissibility-confirmation-information including the user-candidate-face-image, the entry-permissibility-confirmation-information inquiring whether the vehicle is to be set to the first entry-enabled-state.

9. A vehicle control method executed by a computer, the method comprising:
a user-candidate-face-image acquiring step that acquires a user-candidate-face-image from a surrounding image of a vehicle, the user-candidate-face-image being a face image of a user candidate of the vehicle, the user candidate of the vehicle being present in surroundings of the vehicle, the surrounding image of the vehicle being taken by a camera provided in the vehicle;
an unregistered-user-getting-on recognizing step that recognizes that an unregistered user gets on the vehicle, the unregistered user not being registered as a user for the vehicle;
an unregistered-user-face-image acquiring step that acquires an unregistered-user-face-image when the unregistered-user-getting-on recognizing step recognizes that the unregistered user gets on the vehicle, the unregistered-user-face-image being a face image of the unregistered user; and
a vehicle entry control step that sets the vehicle to a first entry-enabled-state when a matching degree between the user-candidate-face-image and the unregistered-user-face-image is equal to or higher than a first determination level, after the unregistered-user-getting-on recognizing step recognizes that the unregistered user gets on the vehicle until a predetermined time elapses, the user-candidate-face-image being acquired by the user-candidate-face-image acquiring step.

10. A non-transitory computer readable recording medium on which a vehicle control program is recorded, the vehicle control program causing a computer to function as:
a user-candidate-face-image acquiring unit that acquires a user-candidate-face-image from a surrounding image of a vehicle, the user-candidate-face-image being a face image of a user candidate of the vehicle, the user candidate of the vehicle being present in surroundings of the vehicle, the surrounding image of the vehicle being taken by a camera provided in the vehicle;

an unregistered-user-getting-on recognizing unit that recognizes that an unregistered user gets on the vehicle, the unregistered user not being registered as a user for the vehicle;

an unregistered-user-face-image acquiring unit that acquires an unregistered-user-face-image when the unregistered-user-getting-on recognizing unit recognizes that the unregistered user gets on the vehicle, the unregistered-user-face-image being a face image of the unregistered user; and a vehicle entry control unit that sets the vehicle to a first entry-enabled-state when a matching degree between the user-candidate-face-image and the unregistered-user-face-image is equal to or higher than a first determination level, after the unregistered-user-getting-on recognizing unit recognizes that the unregistered user gets on the vehicle until a predetermined time elapses, the user-candidate-face-image being acquired by the user-candidate-face-image acquiring unit.

* * * * *